United States Patent
Wrench, Jr.

(10) Patent No.: US 7,185,197 B2
(45) Date of Patent: Feb. 27, 2007

(54) METHOD AND APPARATUS TO FACILITATE SECURE NETWORK COMMUNICATIONS WITH A VOICE RESPONSIVE NETWORK INTERFACE DEVICE

(75) Inventor: Edwin H. Wrench, Jr., San Diego, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 902 days.

(21) Appl. No.: 09/731,836

(22) Filed: Dec. 8, 2000

(65) Prior Publication Data

US 2002/0104025 A1 Aug. 1, 2002

(51) Int. Cl.
*H04L 9/32* (2006.01)
*G10L 21/00* (2006.01)

(52) U.S. Cl. .................. 713/168; 704/270.1; 713/182; 713/186

(58) Field of Classification Search ................ 713/201, 713/200, 186, 182, 168, 185; 704/270.1
See application file for complete search history.

(56) References Cited

U.S. PATENT DOCUMENTS 4,773,093 A 9/1988 Higgins et al.

(Continued)

FOREIGN PATENT DOCUMENTS

| WO | WO 99/23852 | 5/1999 |
|---|---|---|
| WO | WO 00/51280 | 8/2000 |

OTHER PUBLICATIONS

Microsoft Passport Technical White Paper; pp. 1-13, 1999-2000.

(Continued)

*Primary Examiner*—Emmanuel L. Moise
*Assistant Examiner*—Michael Pyzocha
(74) *Attorney, Agent, or Firm*—Edell, Shapiro & Finnan, LLC (57) ABSTRACT

A system for facilitating secure network communications includes a security computer system and corresponding software. The security system is utilized in conjunction with a voice browser residing on a server system. A user accesses the network by placing a call to the voice browser system. The voice browser includes a software module that creates a secure connection to the security system. The user provides an identification to the voice browser system that is transferred to and verified by the security system. Once the identification is verified, the user is prompted by the voice browser system to speak a phrase for voice verification. The verification speech signals are transferred from the voice browser system to the security system to verify those speech signals against speech signals of a particular authorized user associated with the identification and stored in a database. When the user is verified, the security system retrieves a user private key and certificate from the database. In response to the user subsequently accessing a web site residing on a secure server, the secure server and voice browser system initiate a secure key exchange. During the key exchange, data packets containing security information are transferred from the voice browser system to the security system for processing, while security information from the security system is transferred to the secure server via the voice browser system. The resulting session key is securely transferred to the voice browser system to facilitate secure communications between the voice browser system and secure server.

26 Claims, 7 Drawing Sheets

U.S. PATENT DOCUMENTS

| | | | |
|---|---|---|---|
| 4,837,830 A | 6/1989 | Wrench, Jr. et al. | |
| 4,897,878 A | 1/1990 | Boll et al. | |
| 5,218,668 A | 6/1993 | Higgins et al. | |
| 5,271,008 A | 12/1993 | Limb | |
| 5,335,276 A * | 8/1994 | Thompson et al. | 380/266 |
| 5,339,385 A | 8/1994 | Higgins | |
| 5,341,426 A * | 8/1994 | Barney et al. | 713/171 |
| 5,414,755 A | 5/1995 | Bahler et al. | |
| 5,594,789 A * | 1/1997 | Seazholtz et al. | 379/88.02 |
| 5,806,040 A | 9/1998 | Vensko | |
| 5,937,381 A | 8/1999 | Huang et al. | |
| 5,940,799 A * | 8/1999 | Bruckert et al. | 704/273 |
| 5,953,700 A * | 9/1999 | Kanevsky et al. | 704/270.1 |
| 5,978,918 A | 11/1999 | Scholnick et al. | |
| 6,023,764 A | 2/2000 | Curtis | |
| 6,035,402 A | 3/2000 | Vaeth et al. | |
| 6,266,418 B1 * | 7/2001 | Carter et al. | 380/257 |
| 6,484,263 B1 * | 11/2002 | Liu | 713/201 |
| 6,501,832 B1 * | 12/2002 | Saylor et al. | 379/88.04 |
| 6,510,415 B1 * | 1/2003 | Talmor et al. | 704/273 |
| 6,560,576 B1 * | 5/2003 | Cohen et al. | 704/270 |
| 6,601,762 B2 * | 8/2003 | Piotrowski | 235/382 |
| 6,671,672 B1 * | 12/2003 | Heck | 704/273 |
| 6,721,705 B2 * | 4/2004 | Kurganov et al. | 704/270.1 |
| 2002/0052747 A1 * | 5/2002 | Sarukkai | 704/270 |

OTHER PUBLICATIONS

David P. Kormann and Aviel D. Rubin; Risks of the Passport Single Signon Protocol; pp. 1-11, Web Site printout of Apr. 7, 2000.

Motorola Introduces Voice Browser Technology for Accessing Web Content from Telephones; pp. 1-3, Sep. 30, 1998.

Alan O. Freier, Philip Karlton & Paul C. Kocher; The SSL Protocol Version 3.0; Nov. 18, 1996; pp. 1-59.

WebKey The Complete Solution for Voice-Print Based User Identification for Internet-Based Services: A New Concept; pp. 1-4, Web Site printout of Jul. 12, 2000.

SpeakerKey Services: The Complete Solution for Speech-Based User Access and Identification: A New Concept; pp. 1-6, Web Site printout of Jul. 12, 2000.

* cited by examiner

METHOD AND APPARATUS TO FACILITATE SECURE NETWORK COMMUNICATIONS WITH A VOICE RESPONSIVE NETWORK INTERFACE DEVICE

BACKGROUND OF THE INVENTION

1. Technical Field

The present invention pertains to systems facilitating secure network communications. In particular, the present invention pertains to an apparatus or system facilitating secure network communications for users accessing the network via voice responsive interfaces.

2. Discussion of the Related Art

Generally, computer systems are utilized to access and navigate through a communications network, such as the Internet. These computer systems each typically include an input device (e.g., keyboard, mouse, etc.) and network navigation software (e.g., a browser) to traverse the network and communicate with various network sites. In order to prevent unauthorized access to information transmitted over the network, secure communication techniques may be employed that typically utilize certificates and private keys to verify a user identity and encrypt transferred information. The certificate is issued to a user by a certificate authority that basically ensures the identity of the particular user receiving the certificate. The certificate includes a public key and other identification information for a user and is stored along with a private key on a user computer system. When information is requested by the user computer system from a secure network site or web server system, a secure key exchange is negotiated between the user computer system and web server system typically utilizing a public-key/private-key scheme. Basically, certificates for the user computer system and web server system are initially transferred to provide the respective systems with the other's public key for performing the key exchange. The key exchange makes use of shared data plus public and private keys to allow both participants in the connection to generate a common secure session key. The key exchange results in a session key that is used to encrypt and decrypt subsequent information transferred between the user computer system and web server system to provide a secure session. An exemplary computer protocol for this type of secure information transference is the Secure Sockets Layer (SSL) protocol.

Further, network sites may employ security measures to verify authorized users and control access to the sites and/or site information. One such technique includes utilization of account or user names and corresponding passwords to control access to a network site. This technique may be utilized for each independent site, or a single user name and password may be utilized for multiple sites. For example, the Passport protocol, available from Microsoft Corporation, permits access to multiple web sites based on a single user name and password. The protocol includes a client computer system employing a browser, a merchant server and a protocol server. The protocol server maintains authentication and profile information for a client and provides the merchant server with access to this information when permitted by the client. In operation, a client, via the client computer system, accesses a merchant site requiring client authorization. The client system is redirected by the merchant server to the protocol server where the client provides the appropriate user name and password (e.g., "logs in" to the protocol server). This interaction utilizes the Secure Sockets Layer (SSL) protocol. The protocol server redirects the client system to the merchant site and provides the client system with encrypted authentication information for that site. The authentication information is encrypted using a triple Data Encryption Standard (DES) technique having a key previously established between the merchant server and protocol server. The merchant server verifies the client based on the authentication information, and stores an encrypted file (e.g., cookie file) in the client system to enable authentication of the client by the merchant server for subsequent visits to that site (e.g., without repeating the protocol server login procedure). In addition, the protocol server similarly stores an encrypted file (e.g., cookie file) on the client system to enable authentication of the client by the protocol server for other sites (e.g., without repeating the login procedure). The Passport protocol further enables a client to provide personal and credit card information for selective transfer to multiple servers for purchasing products over the network.

In addition, voice verification may be utilized in various systems and may be implemented by varying techniques to provide appropriate security. For example, co-pending U.S. patent application Ser. No. 08/960,509, entitled "Voice Authentication System" and filed Oct. 28, 1997, discloses a speaker authentication system operable in first and second modes. The first mode facilitates enrollment of users, while the second mode verifies that a person is a particular authorized user. The system includes a user interface and a verification module. The interface facilitates communication between a user and the verification module and operates in the first mode to prompt the user to utter a first set of phrases for enrolling the user. The user interface further prompts a user seeking verification in the second mode to utter a randomized second set of phrases corresponding to the first phrase set. The verification module generates voice models corresponding to the first set of speech utterances received from the user in the first mode and compares the voice models in the second mode to the randomized second set of speech utterances to verify that the user is a particular authorized user. The system may control remote computer access or access to information on network sites based on verification of user utterances.

U.S. Pat. No. 5,339,385 (Higgins) discloses a speaker verification system that accepts or rejects the claimed identity of an individual based on an analysis of the individual's utterances. The individual is prompted to speak test phrases selected randomly and composed of words from a small vocabulary. The system determines nearest-neighbor distances between speech frames derived from the spoken test phrases and speech frames of corresponding vocabulary words from previously stored utterances of an enrolled speaker. In addition, distances between the spoken test phrases and corresponding vocabulary words for a set of reference speakers are determined by the system. The claimed identification is accepted or rejected based on the relationship of the determined distances to a predetermined threshold.

U.S. Pat. No. 5,414,755 (Bahler et al) discloses a method for passive voice verification in a telephone network. A telephone long distance service is provided using speaker verification to determine the validity of a user. The user claims an identity by providing an identification, typically a calling card number, to a telephone. Unrestricted, extemporaneous speech of a group of customers are digitized, analyzed and characterized as a non-parametric set of speech feature vectors. The extemporaneous speech of the user is digitized and analyzed in a similar manner. The user identity is verified by comparing a reference utterance of a known customer with utterances from one or more unknown users, one of which is the user claiming the identity of a known customer. The comparison results in a decision to accept or reject the claimed identity, where the identity to be tested is derived from the calling card number.

U.S. Pat. No. 5,806,040 (Vensko) discloses a speech controlled verification system for verifying the identity of a person using a telephone calling card, bank card or other credit card. The system connects the person to a telephone network to enter the card number. The card number is utilized to access a central database and retrieve a voice verification template corresponding to the entered card number. The system prompts the user to state one of the words, phrases and/or numbers contained in the retrieved voice verification template, and compares the stated words to the template. If the stated words match the template, the user is considered to be an authorized user and the card is validated.

U.S. Pat. No. 5,937,781 (Huang et al) discloses a voice verification system for telephone transactions. The system includes a mechanism to prompt the user to speak in a limited vocabulary, and a feature extractor that converts the limited vocabulary into a plurality of speech frames. A pre-processor is coupled to the feature extractor for processing the speech frames to produce a plurality of processed speech frames, while a frame label is assigned to each speech frame via a Viterbi decoder. The processed frames and frame labels are combined to produce a voice model that is compared to an authorized user voice model derived during a previous enrollment session. The user voice model is further compared with an alternative voice model set derived during previous enrollment sessions. The claimed identity is accepted when the user voice model more closely resembles the authorized user voice model than the alternative voice model set.

Voice technology may further be employed by network browsers to interact with users and enhance accessibility to networks. With respect to the Internet, voice responsive browsers permit users to call an Internet Service Provider (ISP) via telephone and navigate the Internet by voice commands. Web pages retrieved by a voice responsive browser generally include extended definitions to enable the voice responsive browser to process those pages. The definitions provide the web page audio to synthesize for transmission to a caller and the appropriate speech to receive from the caller in response to a retrieved web page. Thus, the voice responsive browser basically provides audio to a caller to describe actions for a web page and performs commanded actions in response to appropriate voice commands from the caller with respect to that web page (e.g., relating to web page buttons or other selections). An example of a voice browser is disclosed in U.S. Pat. No. 5,915,001 (Uppaluru).

The related art suffers from several disadvantages. In particular, when a telephone or similar device is utilized by a user to access a network via a voice responsive interface, the user does not have a computer system or memory for storing security information, such as a certificate and/or private key. This precludes use of the above-described techniques for secure network communications and restricts the network activities and navigational capabilities of the user. Although security information may be stored remotely, this exposes the security information to an increased risk of misappropriation, thereby allowing unauthorized users to improperly obtain security privileges to secure network sites and information.

OBJECTS AND SUMMARY OF THE INVENTION

Accordingly, it is an object of the present invention to facilitate secure network communications for network access via voice responsive network interface devices.

It is another object of the present invention to facilitate secure network communications with security information remotely stored from a user.

Yet another object of the present invention is to control access to security information that facilitates secure network communications by verifying the identity of a caller based on caller speech signals.

The aforesaid objects are achieved individually and in combination, and it is not intended that the present invention be construed as requiring two or more of the objects to be combined unless expressly required by the claims attached hereto.

According to the present invention, a system for facilitating secure network communications includes a security computer system and corresponding software. The security system is utilized in conjunction with a voice responsive network navigation tool or browser residing on a server system. A user accesses the network by placing a call to the voice browser system. The voice browser includes a software module in the form of a "plug-in" that creates a secure connection to the security computer system. The user provides an identification to the voice browser system in the form of speech or touch tone signals that is transferred to and verified by the security system. Once the identification is verified, the user is prompted by the voice browser system to speak a phrase for voice verification. The verification speech signals are transferred from the voice browser system to the security system to verify the transferred speech signals against speech signals of a particular authorized user associated with the identification and stored in a database. When the user is verified, the security system retrieves a user private key and certificate from the database to provide secure network communications. In particular, when the user subsequently accesses a network or web site residing on a secure server and employing security measures, the secure server and voice browser system negotiate a secure key exchange as described above. During the key exchange process, data packets containing security information are transferred from the voice browser system to the security system for processing, while security information from the security system is transferred to the secure server via the voice browser system. The resulting session key is securely transferred from the security system to the voice browser system to facilitate secure communications between the voice browser system and secure server as described above.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

DETAILED DESCRIPTION OF THE PREFERRED EMBODIMENTS

Figure 1:
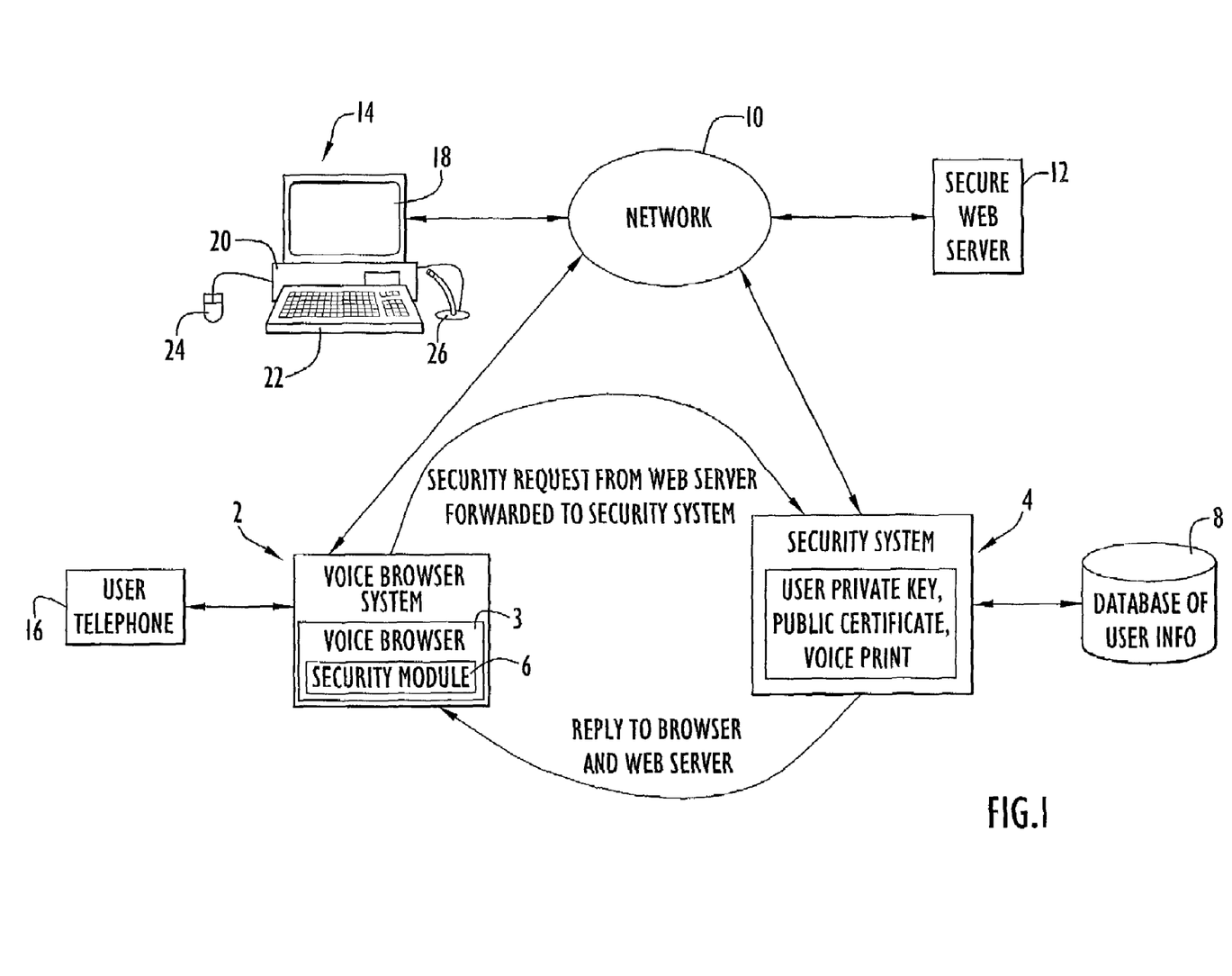
FIG. 1 is a diagrammatic illustration of a voice interface security system according to the present invention coupled to a network and a voice responsive network access device to facilitate secure communications over that network for voice access.

An exemplary network topology employing secure network communications for voice access in accordance with the present invention is illustrated in FIG. 1. Specifically, the topology includes a voice browser system 2, a security system 4, a network 10 (e.g., the World Wide Web or Internet), a secure web server 12 and an end-user system 14. The secure web server typically contains a desired network site and may be accessed by end-user system 14 and/or voice browser system 2 via network 10. Voice browser system 2 is coupled to network 10 and provides access to the network via voice commands received from a conventional telephone 16. The telephone may alternatively be implemented by any conventional or other communications device (e.g., cellular telephone, wired or land based telephone, wireless communication devices, computer system with audio input device, such as a microphone, etc.). Thus, a user may access the voice browser system and utilize voice commands to navigate and/or interact with the network via any telephone or other communications device. Security system 4 is coupled to a database 8 and voice browser system 2 to facilitate secure communications with secure web server 12 over network 10 when a user accesses the network by telephone 16 as described below.

End-user system 14 is coupled to network 10 and may access secure web server 12 based on manual user entry of data (e.g., keyboard, mouse, etc.) or based on voice signals via voice browser system 2. The end-user system may be implemented by any conventional or commercially available personal or other type of computer system (e.g., IBM-compatible, Apple, Sun, desktop, laptop, PDA, etc.) preferably equipped with a display or monitor 18, a base 20 (i.e., including the processor, memories and internal or external communications devices (e.g., modem, network cards, etc.)), a keyboard 22 and optional input devices, such as mouse 24 and/or microphone 26. The end-user system includes software (e.g., operating system, Internet browser or other network navigation tool, etc.) to communicate with secure server 12 and/or voice browser system 2, and appropriate components (e.g., processor, disk storage or hard drive, RAM, etc.) having sufficient processing and storage capabilities to effectively execute the software. The end-user system may utilize any of the major platforms (e.g., Linux, MacIntosh, Unix, OS2, Windows, etc.). Similarly, secure server system 12 is typically implemented by a conventional personal or other suitable computer system preferably equipped with a display or monitor, abase (i.e., including the processor, memories and internal or external communication devices (e.g., modem, network cards, etc.)), a keyboard and optional mouse or other input devices. The secure web server system includes software (e.g., operating system, server software, etc.) to communicate with end-user system 14 and voice browser system 2, and appropriate components (e.g., processor, disk storage or hard drive, RAM, etc.) having sufficient processing and storage capabilities to effectively execute the software. The server system may utilize any of the commercially available operating systems and/or server software.

In operation, end-user system 14 typically stores a user certificate and private key to facilitate communications with a secure network site, such as sites residing on secure server 12. In particular, when end-user system 14 requests a web page from secure server 12, a secure key exchange is negotiated between the end-user system and secure server by using the private and public keys of the respective systems as described above. The user private key is stored on end-user system 14 and access is typically protected by a password or other security technique. The negotiation results in a session key that is utilized to encrypt and decrypt transmissions over the network for a session as described above.

However, when network 10 is accessed via telephone 16, a user has no local storage mechanism to store the user private key and facilitate secure communications. Accordingly, the present invention facilitates secure communications over the network and access to secure network sites via telephone 16. Specifically, the present invention includes security system 4 and a security module 6 that in combination provide the security measures to enable a user to access and facilitate secure communications with secure web server 12 via voice browser system 2 and telephone 16. Initially, the voice browser system may be implemented by any conventional or other suitable computer system preferably including a base having the processor, memories and internal or external communications devices (e.g., modem, network cards, telephony equipment to answer user calls, etc.)). The voice browser system may optionally include a display or monitor, a keyboard, a mouse or other input or display devices. The voice browser system includes a voice responsive browser 3 and other software (e.g., operating system, server software, etc.) to communicate with a user via telephone 16 and with network 10, and appropriate components (e.g., processor, disk storage or hard drive, RAM, etc.) having sufficient processing and storage capabilities to effectively execute the software. The voice browser system may utilize any of the commercially available operating systems and basically functions as a server (e.g., for an Internet Service Provider (ISP)). The voice responsive browser basically facilitates navigation and interaction with network 10 in response to user voice commands and provides audio to the user in order to describe network sites to the user. The voice browser may be implemented using any conventional or commercially available products or techniques, such as those disclosed in U.S. Pat. No. 5,915,001 (Uppaluru), the disclosure of which is incorporated herein by reference in its entirety. A user accesses the voice browser system by placing a telephone call to the voice browser system via telephone 16 and utilizing voice commands to instruct the voice browser to navigate network 10.

Security system 4 and security module 6 in combination facilitate communications between the voice browser system and secure web server 12. The security module is typically implemented in software in the form of a "plug-in" (e.g., software that extends the basic features of a software package and functions as though it is part of that package) for the voice responsive browser and resides on the voice browser computer system. The security module communicates with the security system to verify a caller identity and to receive negotiated session keys for communicating with secure server 12 as described below. The security system is typically implemented by a conventional personal or other suitable computer system preferably equipped with a display or monitor, a base (i.e., including the processor, memories and internal or external communication devices (e.g., modem, network cards, router, etc.)), a keyboard and optional mouse or other input devices. The security system includes software (e.g., operating system, communications software, database access software, security software, etc.) to communicate with voice browser system 2 and access database 8, and appropriate components (e.g., processor, disk storage or hard drive, RAM, etc.) having sufficient processing and storage capabilities to effectively execute the software. The security system may utilize any of the commercially available operating systems.

The security system and voice browser system may reside on the same local network, or alternatively may communicate with each other over network 10 via another socket or communication channel, or via any other suitable communications medium (e.g., LAN, WAN, private network, etc.). The security system is preferably implemented by an individual computer system, but may alternatively reside with the security module on the voice browser system. Database 8 may be implemented by any conventional or other database or storage system, and typically contains voice information and user certificates and private keys to respectively verify caller identities and negotiate a secure session as described below.

Figure 2:
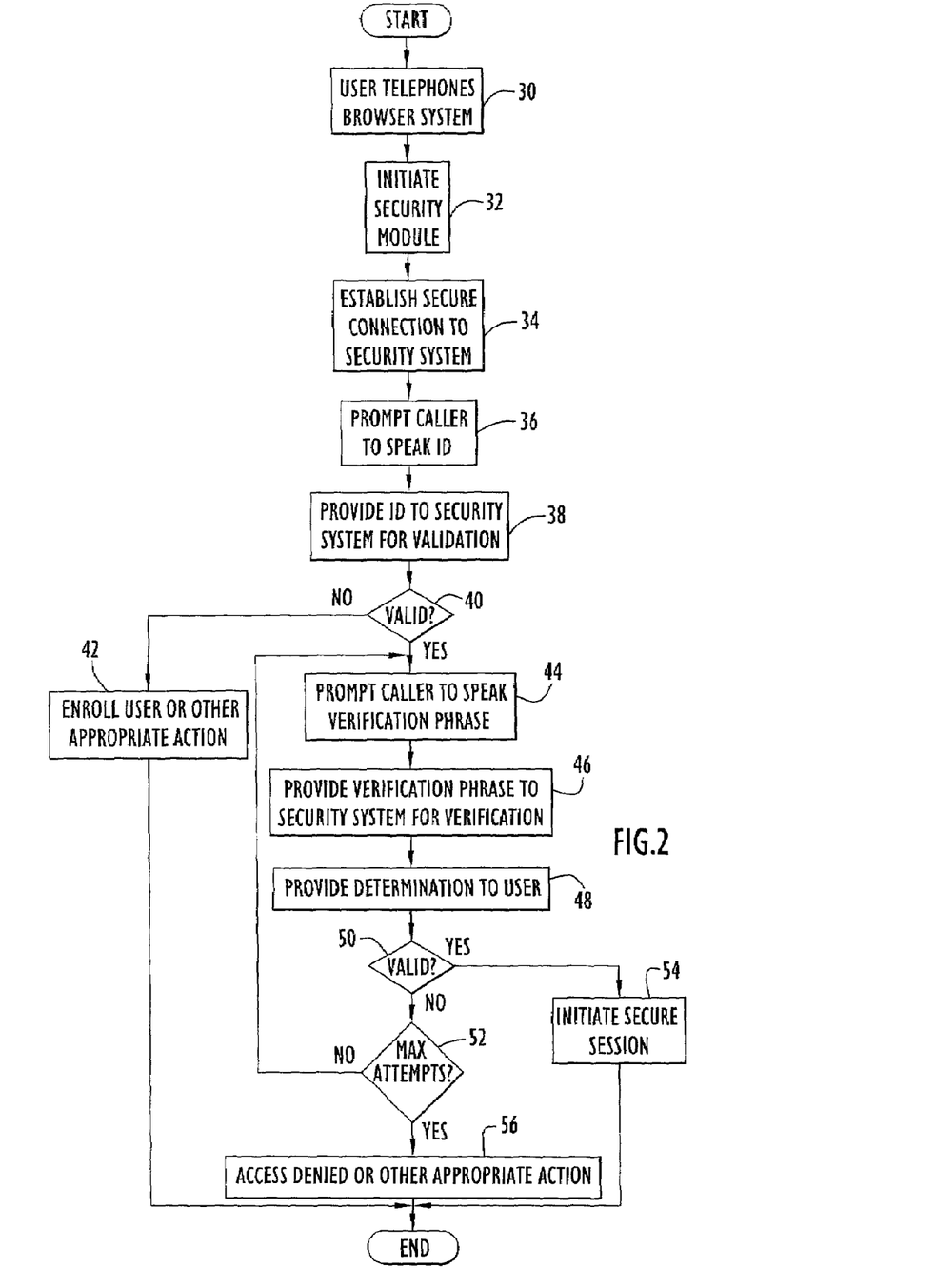
FIG. 2 is a procedural flow chart illustrating the manner in which the security module of the voice interface security system of FIG. 1 facilitates verification of a caller according to the present invention.

The security module basically initiates user verification and identifies security relevant information for forwarding to the security system. The security module in combination with the security system provide users of voice browsers with secure access to their certificates and private keys stored in database 8. The security system negotiates the session key for use between the voice browser and a secure server web site. Thus, the present invention reduces risks associated with remote storage of private keys. The manner in which the security module performs verification functions is illustrated in FIG. 2. Initially, a caller places a telephone call to voice browser system 2 at step 30 via telephone 16. The voice browser executes the security module in response to the user connection or telephone call at step 32. Specifically, the security module establishes a secure connection (e.g., encrypted) to the security system at step 34 via network 10 or other communications medium, and prompts the caller to speak or enter an identification (e.g., name, number, etc.) at step 36. The security module and security system may each include certificates to establish a secure session between them. The voice or touch tone signals provided by the caller representing the caller identification are retrieved and processed (e.g., digitized, etc.) by the voice browser system and subsequently forwarded to the security system for verification at step 38. If the caller identification is invalid as determined at step 40, appropriate action is taken at step 42 (e.g., log as security breach, enroll caller as new user, disconnect, etc.).

When the security system has determined that the caller identification is valid at step 40, the security system via the security module initiates a voice verification session with the caller at step 44. In particular, the security module prompts the caller to speak a pass phrase, a random digit string or any combination of these two items. The spoken verification phrase is retrieved and processed (e.g., digitized, etc.) by the voice browser system and forwarded to the security system for verification of the caller's identity at step 46. The verification results are forwarded to the voice browser system and are provided to the caller at step 48. If the caller's voice signals correspond with the voice information associated with the caller identification and stored in database 8 as determined at step 50, the user certificate and private key are retrieved by the security system from the database at step 54 to initiate communications with a secure site. When the caller is not verified as determined at step 50, and the quantity of attempts is less than a predetermined limit as determined at step 52, the caller is prompted to repeat the verification phrase at step 44. If the caller is not verified within the predetermined quantity of attempts as determined at step 52, access to the user security information (e.g., certificate and private key) is denied and/or other appropriate action is taken (e.g., the connection is terminated) at step 56. Once the caller is verified and the appropriate information is retrieved from database 8, the security system is in a state to facilitate secure communications for the voice browser system as described below.

Figure 3:
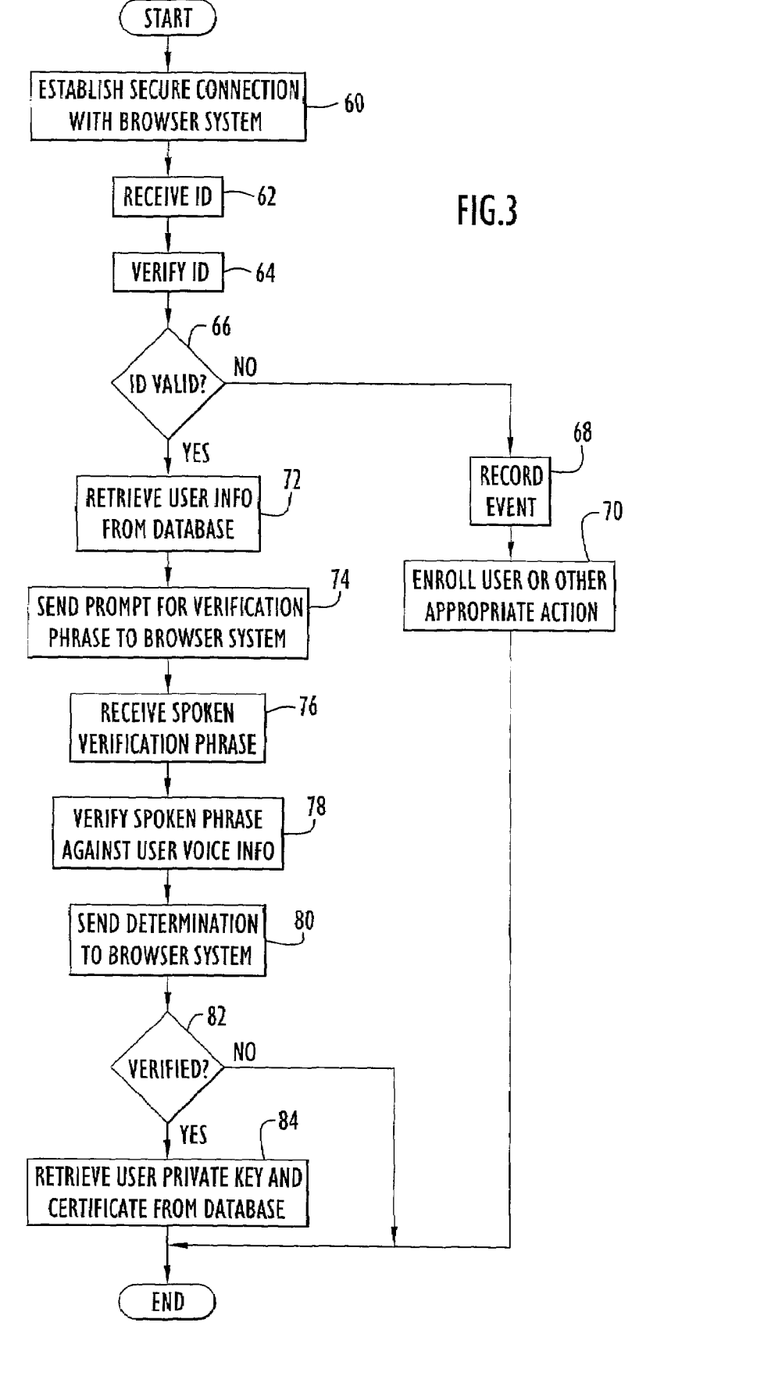
FIG. 3 is a procedural flow chart illustrating the manner in which the security system of the voice interface security system of FIG. 1 verifies a caller according to the present invention.

The manner in which the security system receives and processes information from the security module to verify a caller is illustrated in FIG. 3. Initially, the security system establishes a secure connection with the voice browser system at step 60, and receives the spoken or entered identification from the security module at step 62. The identification is verified by the security system at step 64 by comparing the spoken or touch tone identification to valid identifications stored in database 8. If the identification does not reside in the database as determined at step 66, the security system may record the event as a possible security violation at step 68 and attempt to enroll the caller as a new user or perform other appropriate actions at step 70. After such actions are completed, the caller may re-attempt access or have the connection terminated.

When the identification is valid as determined at step 66, voice information corresponding to the valid identification is retrieved by the security system from the database at step 72 in order to verify the caller identity. Initially, authorized users are enrolled with the security system and assigned an identifier (e.g., a user name or identification). During the enrollment process, each user is prompted to speak particular vocabulary words. The spoken words for each user are verified against the user prompts to ensure validity of the spoken words, and are subsequently processed for storage in database 8 based on the corresponding user identification. The stored words of enrolled users are later retrieved based on the user identification provided by a caller for comparison with spoken words of the caller to verify the caller identity. The voice browser and security systems may utilize various techniques to process voice signals received from users, enroll users and verify users, such as those disclosed in U.S. Pat. No. 5,339,385 (Higgins) and U.S. Pat. No. 5,937,381 (Huang et al) and co-pending U.S. patent application Ser. No. 08/960,509, entitled "Voice Authentication System" and filed Oct. 29, 1997. The aforementioned patents and patent application are incorporated herein by reference in their entireties.

The security system retrieves vocabulary words within the enrollment data at step 74 for forwarding to the voice browser system. The voice browser system prompts the caller to speak the selected words, and the spoken words are received, processed (e.g., digitized, etc.) and forwarded by the voice browser system to the security system via a secure connection (e.g., encrypted) at step 76. The spoken words are verified against the enrollment voice information retrieved from the database and associated with the provided user identification at step 78. This may be accomplished utilizing various techniques, such as those disclosed in the above-mentioned Higgins (U.S. Pat. No. 5,339,385) and Huang et al patents (U.S. Pat. No. 5,937,381) and U.S. patent application Ser. No. 08/960,509. The resulting determination is forwarded to the voice browser system at step 80 to inform the caller of the verification results. If the caller is verified as determined at step 82, the user certificate and private key are retrieved from the database at step 84 to facilitate communications with a secure network site. Otherwise, the caller may re-attempt access or have the connection terminated.

Figure 4:
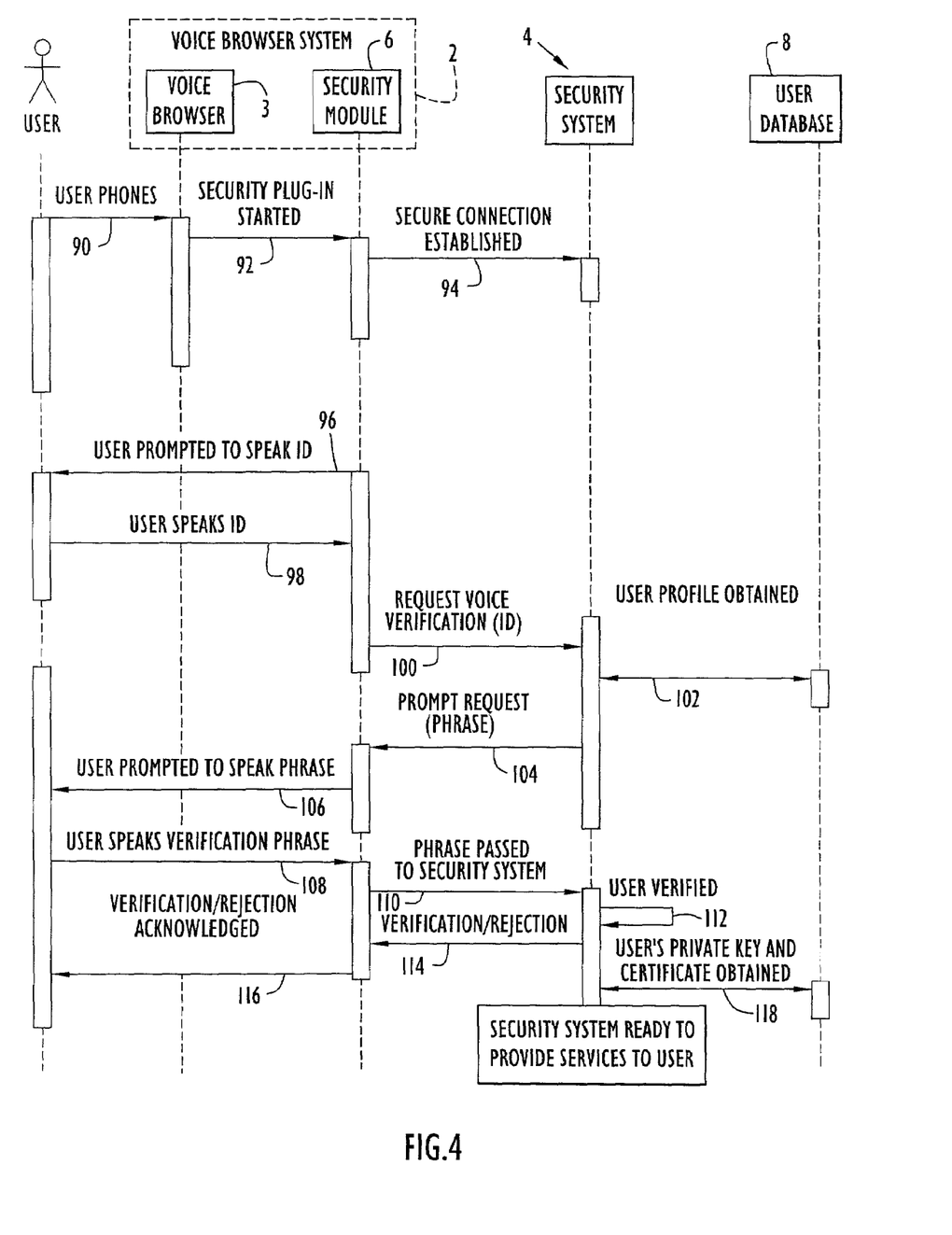
FIG. 4 is a flow diagram illustrating the manner in which the voice interface security system of FIG. 1 verifies a caller based on caller voice signals according to the present invention.

Operation of the system and overall interaction between a caller, voice browser system and security system to verify the caller is diagrammatically illustrated in FIG. 4. Specifically, the caller initially places a telephone call to the voice browser system at flow 90 and the security module is initiated in response to the call at flow 92. The security module subsequently establishes a secure connection with the security system at flow 94, and prompts the caller to speak or enter a user identification at flow 96. The caller provides the user identification at flow 98, and the security module requests voice verification based on the user identification from the security system at flow 100. The security system validates the identification and retrieves a user profile associated with the identification and including voice information at flow 102. An identifying phrase is selected and the security system requests the security module at flow 104 to prompt the caller to speak the phrase at flow 106. The caller responds to the prompt at flow 108 and the spoken phrase is forwarded to the security system at flow 110 for verification at flow 112. The resulting verification determination is forwarded through the security module at flow 114 to the caller at flow 116. If the caller identity is verified, the user private key and certificate are obtained from the database at flow 118.

Once a caller has been verified and the corresponding private key and certificate retrieved from the database, the security system is enabled to negotiate sessions with a secure network site. The security module in the voice browser system basically intercepts security relevant information received from a secure network site and forwards that information from the voice browser system to the security system in order to enable the security system to negotiate the session key with the secure network site. Once the session key is negotiated by the security system and provided to the voice browser system, the voice browser system and secure web server communicate in an encrypted fashion with the session key in substantially the same manner described above for end-user system 14.

Initially, the parameters of a session are determined by a handshake protocol. Basically, the handshake protocol enables the security system and secure web server to negotiate a protocol version, select cryptographic algorithms, and authenticate each other, while public key encryption techniques are utilized to transfer confidential information. By way of example only, the handshake protocol employed by the present invention is the handshake protocol utilized by the Secure Sockets Layer (SSL) protocol. However, any suitable handshake scheme or protocol may be utilized. Specifically, when a user navigates to a secure site, the voice browser system initially sends to the secure web server a client hello message. The secure web server must respond with a server hello message to prevent a fatal error and connection failure. These hello messages are basically utilized to establish security enhancement capabilities between the security system and secure web server and various attributes (e.g., protocol version, session identification (ID), cipher suite (e.g., the cryptographic techniques utilized by the security system and secure web server, typically including a cipher spec (described below) and key exchange algorithm), compression method, etc.). Subsequent transmission of the client and server hello messages, the secure web server transmits to the voice browser system its certificate for authentication, a server key exchange message, a request for a certificate and a hello done message (e.g., indicating completion of the initial phase of the handshake protocol). The security system receives this information from the voice browser system and responds with the certificate and a key exchange message, the format of which is dependent upon the public key algorithm selected between the security system and secure web server. Moreover, the security system transmits a change cipher spec message (e.g., having a protocol specific format) to the secure web server via the voice browser system and copies a pending cipher spec into a current cipher spec. The cipher spec basically contains information describing the manner of encryption for the session, while the change cipher spec message indicates that subsequent information will be transmitted in accordance with the negotiated cipher spec and keys. The security system sends, via the voice browser system, a finished message (e.g., indicating completion of the handshake) to the secure web server encrypted in the negotiated manner (e.g., in accordance with the new cipher spec). The secure web server similarly sends a change cipher spec message to the security system via the voice browser system, transfers the pending cipher spec to the current cipher spec and transmits a finished message encrypted in the negotiated manner (e.g., in accordance with the new cipher spec). Upon receipt of the respective finished messages, the security system forwards the negotiated information to the voice browser system to enable the voice browser system and secure web server to transmit data in accordance with the negotiated cipher spec information.

When the voice browser system and secure web server intend to resume a prior session, the above process may be abbreviated. Generally, the voice browser system transmits a client hello message containing the session ID of the session to be resumed. The secure web server verifies the session ID and, if the secure web server desires to resume that session, transmits a server hello message to the security system via the voice browser system with that session ID value. The security system and secure web server transmit change cipher spec messages and subsequently send their respective finished messages as described above. The negotiated information is forwarded from the security system to the voice browser system to enable transfer of information between the voice browser system and secure web server in the encrypted manner negotiated for that session as described above. If the secure web server does not verify the session ID, or does not desire to resume the session, the handshake protocol described above is repeated to establish a new session.

Figure 5:
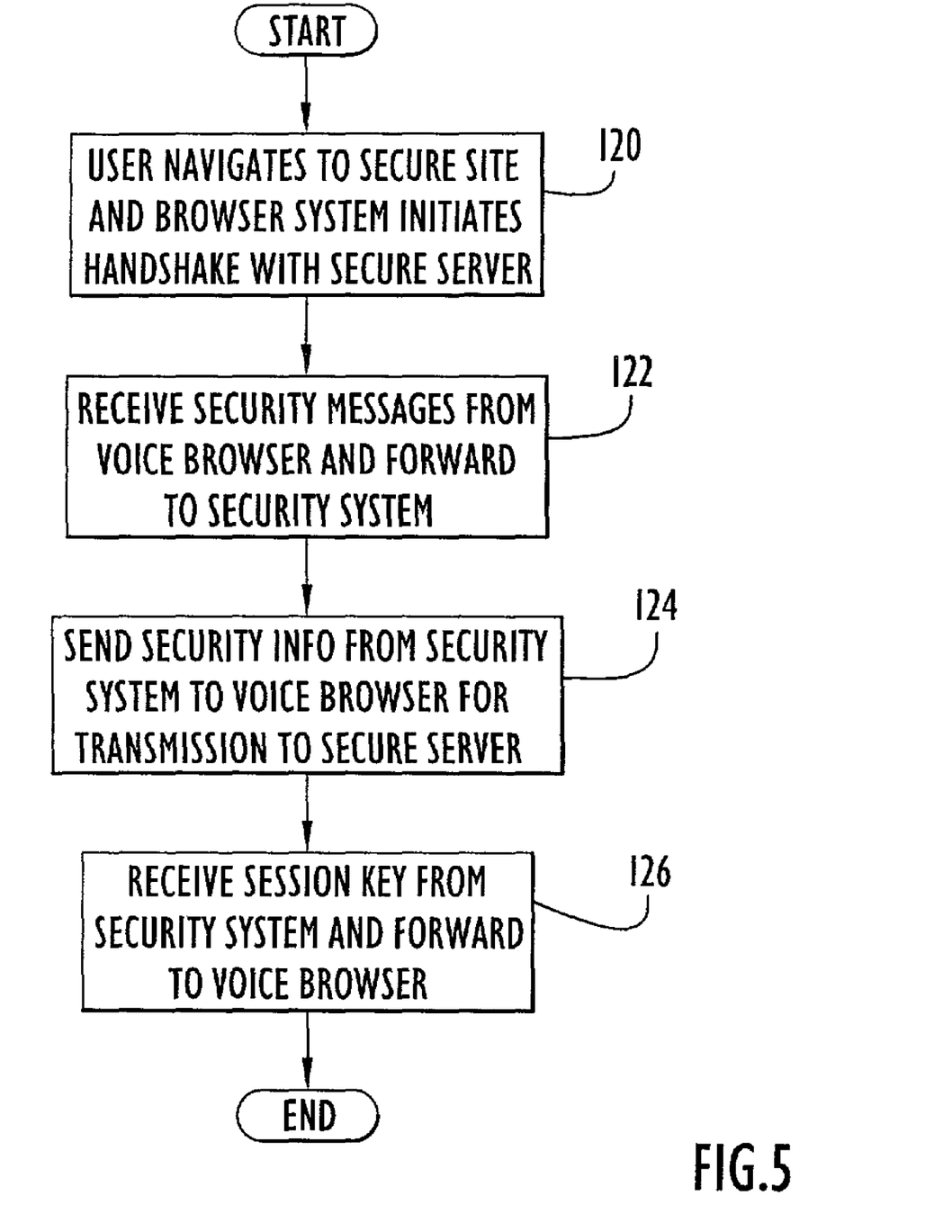
FIG. 5 is a procedural flow chart illustrating the manner in which the security module of the voice interface security system of FIG. 1 facilitates secure communications between the voice browser system and a secure network server according to the present invention.

The security module intercepts security relevant messages received by the voice browser system from the secure web server and forwards them to the security system for processing as illustrated in FIG. 5. Initially, a user navigates to the secure web server at step 120 after voice verification as described above. The voice browser system initiates a handshake with the secure web server in substantially the same manner described above. The voice browser system receives security messages from the secure web server and the security module detects these messages and forwards them to the security system for processing at step 122. The security system processes the messages and transmits reply messages to the voice browser system for forwarding to the secure web server at step 124. Specifically, the security system accesses the user private key and certificate and provides the appropriate information to the voice browser system for transmission to the secure web server as described above. The security system further processes the messages to determine the negotiated key and forwards that key to the voice browser system at step 126 to enable the voice browser system to communicate with the secure web server via the negotiated key in the manner described above for end-user system 14.

Figure 6:
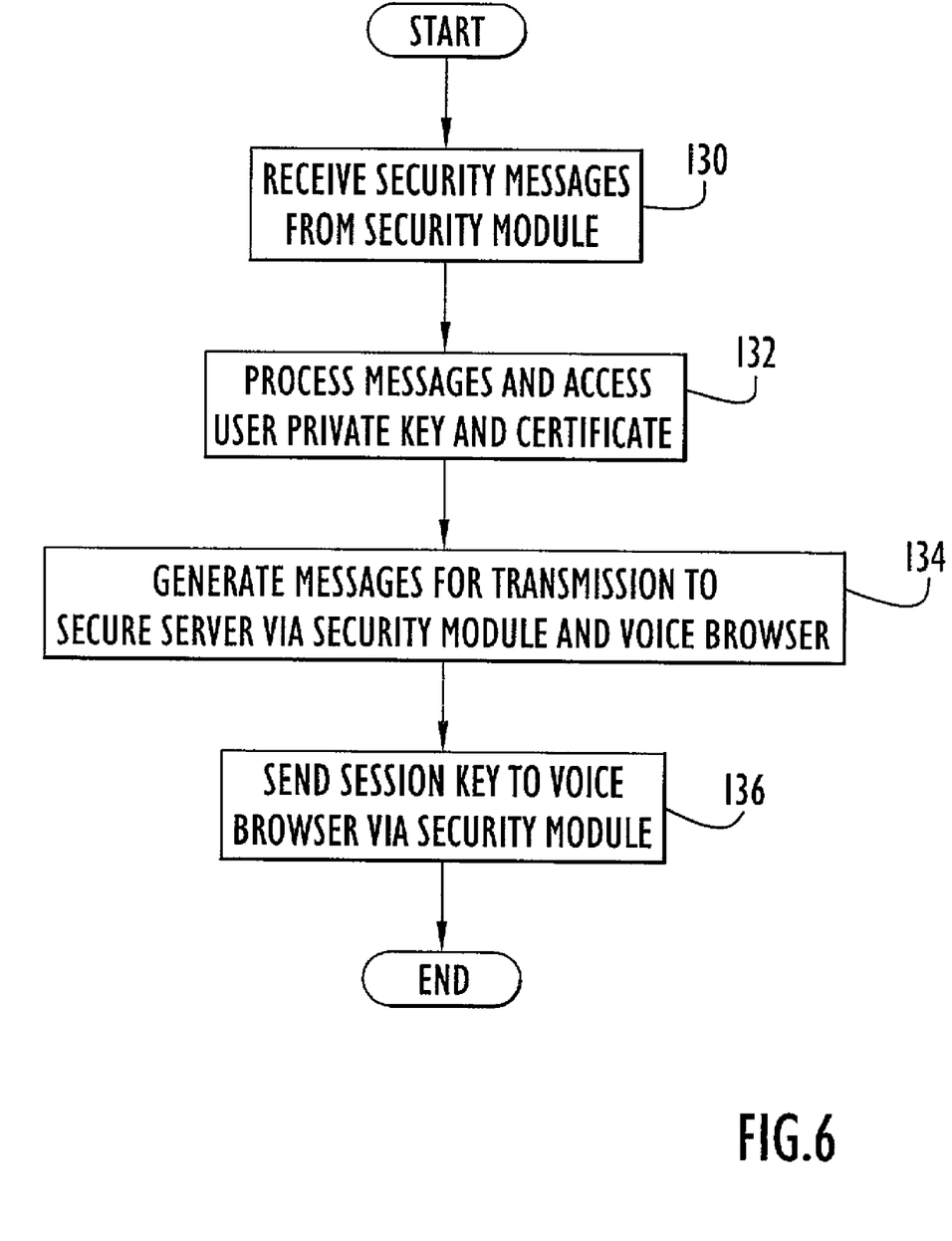
FIG. 6 is a procedural flow chart illustrating the manner in which the security system of the voice interface security system of FIG. 1 facilitates secure communications between the voice browser system and a secure network server according to the present invention.

The manner in which the security system negotiates session parameters with the secure web server is illustrated in FIG. 6. Initially, the security system receives security messages from the security module at step 130 in response to the user navigating to the secure web server and enabling initiation of the handshake protocol as described above. The security system processes the messages and retrieves the user private key and certificate at step 132 to generate responses and provide information (e.g., certificates, key exchange data, etc.) requested in the messages to the voice browser system for forwarding to the secure web server as described above. The appropriate messages are generated at step 134 and sent to the voice browser system for forwarding to the secure web server. When a negotiated session key is determined from the messages by the security system, the key is forwarded to the voice browser system at step 136 to enable the voice browser system to communicate with the secure web server in an encrypted manner via the negotiated key in substantially the same manner described above for the end-user system.

Figure 7:
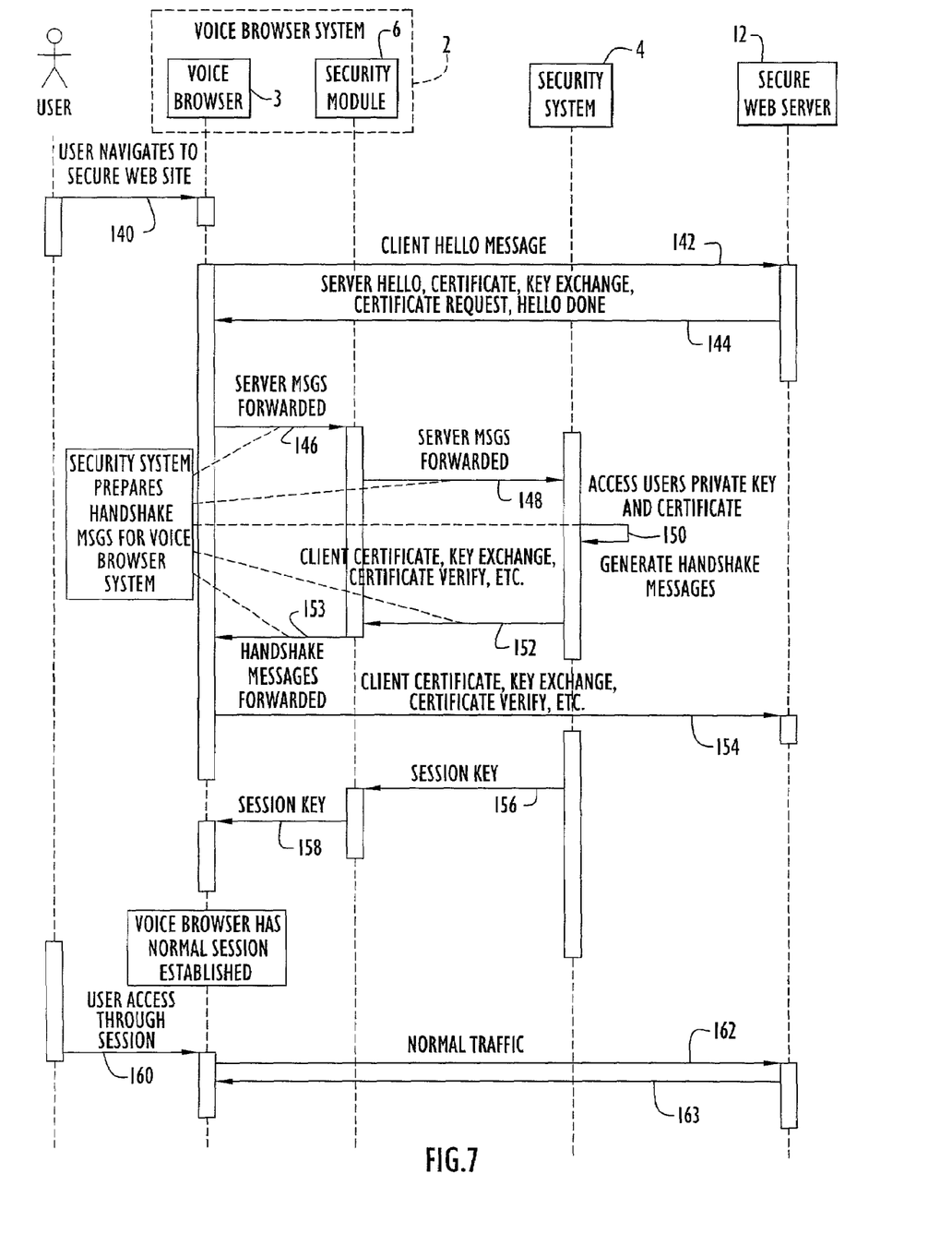
FIG. 7 is a flow diagram illustrating the manner in which the voice interface security system of FIG. 1 facilitates secure communications between the voice browser system and a secure web server according to the present invention.

The operation and overall interaction between the user, voice browser system, security system and secure web server are diagrammatically illustrated in FIG. 7. Initially, a user, subsequent to voice verification, navigates via the voice browser to a site on secure server 12 as indicated at flow 140. The voice browser sends a client hello message to the secure server at flow 142. The secure server responds by transmitting to the voice browser at flow 144 a server hello message, server certificate, server key exchange message, a certificate request and a hello done message as described above. The server messages are received by the voice browser and forwarded to the security system via the security module as indicated by flows 146, 148. The security system accesses the user private key and certificate and generates handshake messages (e.g., client certificate, key exchange message, certificate verify message, etc.) in response to the server messages at flow 150. The response messages are forwarded to the voice browser via the security module as indicated at flows 152, 153 and are transmitted by the voice browser to the secure server at flow 154. The resulting negotiated session key is forwarded from the security system to the voice browser via the security module at flows 156, 158. The voice browser may subsequently provide the user with access to the secure site via the session key as indicated at flow 160, while information is transmitted between the voice browser and secure site in an encrypted manner via the negotiated key at flows 162, 163. The encryption and decryption may be performed utilizing any conventional or other encryption/decryption techniques.

When the voice browser and secure server intend to resume a prior session, the above process may be reduced by utilizing the session ID. In particular, the voice browser transmits a client hello message containing the session ID of the session to be resumed. The secure server verifies the session ID, and if the secure server desires to resume that session, transmits a server hello message to the security system via the voice browser system with that session ID value. The security system and secure server transmit change cipher spec messages and subsequently send their respective finished messages as described above. The negotiated information is forwarded from the security system to the voice browser to enable transfer of information between the voice browser and secure server in the encrypted manner negotiated for that session as described above. If the secure server does not verify the session ID, or does not want to resume the session, the handshake protocol described above is repeated to establish a new session.

It is to be understood that the voice browser system may receive voice commands through various devices and techniques, while the system operates as described above to facilitate secure communications. For example, voice commands may be received over network 10 from various sources (e.g., computer systems, telephone or communications systems, etc.). The voice browser system processes the voice signals and verifies the user via the security system in substantially the same manner described above. Thus, end-user system 14 or other system employing a microphone or other audio input device may enable a user to navigate a network in accordance with voice commands. The voice signals are processed and transmitted to the voice browser system via network 10. The voice browser system interacts with the user as described above and may facilitate communications to secure network sites. The software for the security module and security system is preferably developed in the 'C++' programming language, but may be implemented in any suitable computer language. It is to be understood that one of ordinary skill in the computer arts could develop the software of the security module and security system based on the functional descriptions contained herein and the flow charts and diagrams illustrated in the drawings. The present invention is not limited to the protocols described herein, but may utilize any protocols to establish a session with a server.

It will be appreciated that the embodiments described above and illustrated in the drawings represent only a few of the many ways of implementing a method and apparatus to facilitate secure network communications with a voice responsive network interface device.

The computer systems of the voice browser, end-user, secure web server and security systems may be implemented by any quantity of any personal or other type of computer system (e.g., IBM-compatible, Apple, Macintosh, laptop, palm pilot, etc.). These computer systems may include any commercially available operating system (e.g., Windows, OS/2, Unix, Linux, etc.), any commercially available or custom software (e.g., server software, browser software, voice processing software, security module, security system software, etc.) and any types of input devices (e.g., keyboard, mouse, microphone, etc.). It is to be understood that the software of the security system and security module may be implemented in any desired computer language. The computer systems may alternatively be implemented by hardware or other processing circuitry. The various functions of the voice browser, security module, security system and database may be distributed in any manner among any quantity (e.g., one or more) of modules, computer or processing systems or circuitry where the computer systems may be disposed locally or remotely of each other and communicate via any suitable communications medium (e.g., LAN, WAN, Intranet, Internet, hardwire, modem connection, wireless, etc.). The software and/or algorithms described above and illustrated in the flow charts and diagrams may be modified in any manner that accomplishes the functions described herein.

The network may be implemented by any communications network or medium (e.g., LAN, WAN, Internet, Intranet, direct connection, modem connection, wireless, etc.). The voice browser and security systems may include any conventional or other communications devices, and may communicate over the network or any other communications medium (e.g., LAN, WAN, Intranet, Internet, hardwire, modem connection, wireless, etc.). The voice browser system may be accessed by any suitable communications device (e.g., cellular telephone, wired or land based telephone, wireless communication devices, computer system with audio input device, such as a microphone, etc.).

The voice browser system may accommodate any quantity of users, and include any conventional or other web server, voice processing and voice browser software. The plug-in security module may alternatively be implemented as a separate stand-alone program or software module, or be included with the security system and/or voice browser software. Further, the secure web server may accommodate any type of web page or form, and provide any type of user interface to the end-user or voice browser systems. The user interface may provide or obtain any desired information from the user.

The security system may access the database via any suitable communications medium, devices, query language or protocols. The database may be implemented by any quantity of conventional or other databases or storage structures (e.g., file, data structure, etc.), may be arranged in any fashion and may store any desired information based on any identifiers or keys. The database may reside on any quantity of (e.g., one or more) computer or processing systems separate from the security system and disposed locally or remotely of each other and the security system. The database computer systems may communicate with each other and the security system via any suitable communications medium, devices and protocols (e.g., LAN, WAN, Intranet, Internet, hardwire, modem connection, wireless, etc.). The database may contain any desired information, and may reside on the voice browser and/or security systems.

The voice browser, security module and security system software may be available individually or in any combination on a recorded medium (e.g., magnetic or optical mediums, magneto-optic mediums, floppy diskettes, CD-ROM, memory devices, etc.) for use on stand-alone systems or systems connected by a network or other communications medium, and/or may be downloaded (e.g., in the form of carrier waves, packets, etc.) individually or in any combination to systems via a network or other communications medium.

The database or other storage device may contain any quantity of any type of security information to facilitate secure network communications (e.g., certificates, keys, parameters, etc.). The user identification may include any quantity of any types of alphanumeric or other characters or symbols, and may be entered by a user or caller in any manner (e.g., voice signals, telephone or other keypad, etc.). The voice information may include any quantity of words from any vocabulary, or any speech modeling data (e.g., speech sounds) to verify users. The voice information may be processed in any desired manner for storage in the database. The present invention may utilize any types of conventional or other protocols to negotiate secure session parameters and transfer information in a secure manner. These protocols may utilize any conventional or other encryption and decryption techniques and any quantity of parameters (e.g., any quantity of keys, certificates, identifications, etc.). The caller voice signals may be processed in any manner, and any conventional or other techniques may be utilized to compare the caller voice signals to the stored voice information. The security system may request the caller to speak any quantity of any type of phonetic or speech sounds, words or phrases to verify the caller. The enrollment process and stored voice information identifying the caller may utilize any quantity of any type of phonetic or speech sounds or words or phrases that may be predetermined or selected by a user.

The voice browser and security systems may take any appropriate actions in response to invalid identifications or a caller not being verified (e.g., prompt caller to re-enter information, terminate connection, enroll caller, log event, notify caller of error or invalidity, etc.). Further, these actions may be initiated after any quantity of user attempts to enter valid information and/or voice or speech signals. The present invention is not limited to the specific applications disclosed herein, but may be utilized in substantially the same manner described above to control access to information (e.g., passwords, URLs, computer addresses, street addresses, social security numbers, security information, encryption keys, etc.) and/or network sites. For example, the present invention may control access to passwords, URLs or computer addresses, to initiate an automatic login sequence or transference to the URL or address in response to voice verification. The functions of the voice browser, security module, security system and database may be combined, separated and/or distributed in any manner among any quantity of software modules and/or computer systems.

From the foregoing description it will be appreciated that the invention makes available a novel method and apparatus to facilitate secure network communications with a voice responsive network interface device wherein a security system facilitates secure network communications to a secure network site when a user accesses the network via a voice responsive network interface device.

Having described preferred embodiments of a new and improved method and apparatus to facilitate secure network communications with a voice responsive network interface device, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for facilitating secure encrypted communications over a network with a network interface configured to provide unencrypted sessions with web sites, wherein said network interface includes a voice browser for receiving voice signals from a user and accessing and navigating web sites in accordance with said received voice signals, said system comprising:
- a security module for said network interface to facilitate retrieval of information from said user in the form of voice signals and to detect a secure web server providing encrypted sessions and identify security related information received by said network interface from said secure web server in response to said voice browser accessing a secure web site of said secure web server based on voice commands from said user, wherein said security related information includes information enabling a secure encrypted session with said secure web server;
- a storage unit to store remote from said network interface voice and security information associated with authorized users of said system, wherein said security information includes information enabling negotiation of parameters for secure encrypted sessions with secure web servers; and
- a security system to communicate with said security module and said storage unit and to process for said network interface said identified security information to enable said secure encrypted session, wherein said security system includes:
  - a verification module to verify said user as an authorized system user based on a comparison of said user voice signals with said stored voice information;
  - a retrieval module to retrieve said security information of said verified user from said storage unit; and
  - a negotiation module to receive said identified security information from said security module and negotiate communication parameters with said secure web server utilizing said retrieved security information to facilitate said secure encrypted session between said secure web server and said voice browser.

2. The system of claim 1 wherein said network includes the Internet.

3. The system of claim 1 wherein said network interface is in communication with a communications device located remotely of said network interface, and said security module facilitates retrieval of said user voice signals from said communications device.

4. The system of claim 3 wherein said communications device includes a telephone.

5. The system of claim 3 wherein said communications device includes a computer system having an audio input device.

6. The system of claim 5 wherein said audio input device includes a microphone.

7. The system of claim 1 wherein said security module includes:
- an identification module to identify said security related information received by said network interface from said secure web server;
- a communications module to facilitate communications with said security system and said network interface, wherein said communications module includes:
  - a send module to provide said user information and said identified security information to said security system to facilitate verification of said user and negotiation of said communication parameters;
  - a receive module to receive a request for said user information, verification results, responses to said identified security information and said negotiated communication parameters from said security system; and
- an interface module for providing said responses and said negotiated parameters to said network interface to facilitate secure communications over said network between said secure web server and said voice browser; and
- a user interface module to facilitate said user information request for retrieval of said user information and to provide said verification results to said user.

8. The system of claim 7 wherein said security system further includes:
- an identification verification module to validate an identification within said user information associated with an authorized system user;
- an access module to retrieve said voice information from said storage unit associated with said identification;
- a selection module to select portions of said retrieved voice information and generate said user information request, wherein said generated request includes a request for user information corresponding to said selected portions of said retrieved voice information, and wherein said verification module verifies said user by comparing said user voice signals received from said security module in response to said user information request with said stored voice information associated with an authorized user identified by said identification and said negotiation module processes said identified security information received from said security module and generates said responses thereto with said retrieved security information to negotiate said communication parameters; and
- a security communications module to facilitate communications with said security module, wherein said security communications module includes:
  - a security send module to provide said user information request, said verification results, said generated responses and said negotiated parameters to said security module; and
  - a security receive module to receive said user voice signals and said identified security information from said security module.

9. The system of claim 1 wherein said storage unit includes a database.

10. The system of claim 2 wherein said stored security information includes private keys and certificates of said authorized system users.

11. The system of claim 1 further including:
- an enrollment module to retrieve voice signals from said authorized system users and process said authorized system user voice signals to produce said voice information for storage in said storage unit.

12. A program product apparatus having a computer readable medium with computer program logic recorded thereon for facilitating secure encrypted communications over a network with a network interface configured to provide unencrypted sessions with web sites, wherein said network interface includes a voice browser for receiving voice signals from a user and accessing and navigating web sites in accordance with said received voice signals, said program product apparatus comprising:
- a security module for said network interface to facilitate retrieval of information from said user in the form of voice signals and to detect a secure web server providing encrypted sessions and identify security related information received by said network interface from said secure web server in response to said voice browser accessing a secure web site of said secure web server based on voice commands from said user, wherein said security related information includes information enabling a secure encrypted session with said secure web server;

a storage module to store remote from said network interface voice and security information associated with authorized users, wherein said security information includes information enabling negotiation of parameters for secure encrypted sessions with secure web servers; and a secure communications module for a security system to communicate with said security module and said storage module and to process for said network interface said identified security information to enable said secure encrypted session, wherein said secure communications module includes:

a verification module to verify said user as an authorized user based on a comparison of said user voice signals with said stored voice information;

a retrieval module to retrieve said security information of said verified user from said storage module; and a negotiation module to receive said identified security information from said security module and negotiate communication parameters with said secure web server utilizing said retrieved security information to facilitate said secure encrypted session between said secure web server and said voice browser.

13. The program product apparatus of claim 12 wherein said security module includes:

an identification module to identify said security related information received by said network interface from said secure web server;

a communications module to facilitate communications with said secure communications module and said network interface, wherein said communications module includes:

a send module to provide said user information and said identified security information to said secure communications module to facilitate verification of said user and negotiation of said communication parameters;

a receive module to receive a request for said user information, verification results, responses to said identified security information and said negotiated communication parameters from said secure communications module; and an interface module for providing said responses and said negotiated parameters to said network interface to facilitate secure communications over said network between said secure web server and said voice browser; and a user interface module to facilitate said user information request for retrieval of said user information and to provide said verification results to said user.

14. The program product apparatus of claim 13 wherein said secure communications module further includes:

an identification verification module to validate an identification within said user information associated with an authorized user;

an access module to retrieve said voice information from said storage module associated with said identification;

a selection module to select portions of said retrieved voice information and generate said user information request, wherein said generated request includes a request for user information corresponding to said selected portions of said retrieved voice information, and wherein said verification module verifies said user by comparing said user voice signals received from said security module in response to said user information request with said stored voice information associated with an authorized user identified by said identification and said negotiation module processes said identified security information received from said security module and generates said responses thereto with said retrieved security information to negotiate said communication parameters; and a security communications module to facilitate communications with said security module, wherein said security communications module includes:

a security send module to provide said user information request, said verification results, said generated responses and said negotiated parameters to said security module; and a security receive module to receive said user voice signals and said identified security information from said security module.

15. The program product apparatus of claim 12 further including:

an enrollment module to retrieve voice signals from said authorized users and process said authorized user voice signals to produce said voice information for storage in said storage module.

16. A method of facilitating secure encrypted communications over a network with a network interface configured to provide unencrypted sessions with web sites, wherein said network interface includes a voice browser for receiving voice signals from a user and accessing and navigating web sites in accordance with said received voice signals, said method comprising:

(a) retrieving, via a security module, information from said user in the form of voice signals and detecting a secure web server providing encrypted sessions and identifying security related information received by said network interface from said secure web server in response to said voice browser accessing a secure web site of said secure web server based on voice commands from said user, wherein said security related information includes information enabling a secure encrypted session with said secure web server;

(b) storing remote from said network interface voice and security information associated with authorized users in a storage unit, wherein said security information includes information enabling negotiation of parameters for secure encrypted sessions with secure web servers;

(c) verifying said user as an authorized user based on a comparison of said user voice signals with said stored voice information via a security system;

(d) retrieving, via said security system, said security information of said verified user from said storage unit; and (e) receiving said identified security information from said security module at said security system and negotiating communication parameters for said network interface with said secure web server utilizing said retrieved security information to facilitate said secure encrypted session between said secure web server and said voice browser.

17. The method of claim 16 wherein said network includes the Internet.

18. The method of claim 16 wherein said network interface is in communication with a communications device located remotely of said network interface, and step (a) further includes:

(a.1) retrieving said user voice signals from said communications device.

19. The method of claim 18 wherein said communications device includes a telephone.

20. The method of claim 18 wherein said communications device includes a computer system having an audio input device.

21. The method of claim 20 wherein said audio input device includes a microphone.

22. The method of claim 16 wherein step (a) further includes:
- (a.1) providing said user information to said security system to facilitate verification of said user in response to a request from said security system for user information;
- (a.2) receiving verification results from said security system and providing said verification results to said user;
- (a.3) providing said identified security information to said security system to facilitate negotiation of said communication parameters;
- (a.4) receiving responses to said identified security information and said negotiated communication parameters from said security system; and
- (a.5) providing said responses and said negotiated parameters to said network interface to facilitate secure communications over said network between said secure web server and said voice browser.

23. The method of claim 22 wherein step (c) further includes:
- (c.1) validating an identification within said user information associated with an authorized user;
- (c.2) retrieving said voice information from said storage unit associated with said identification;
- (c.3) selecting portions of said retrieved voice information and generating said user information request, wherein said generated request includes a request for user information corresponding to said selected portions of said retrieved voice information; and
- (c.4) verifying said user by comparing said user voice signals received from said security module in response to said user information request with said stored voice information associated with an authorized user identified by said identification and providing said verification results to said security module; and step (e) further includes:
- (e.1) processing said identified security information received from said security module and generating said responses thereto with said retrieved security information to negotiate said communication parameters; and
- (e.2) providing said responses and negotiated parameters to said security module to facilitate secure communications over said network between said secure web server and said voice browser.

24. The method of claim 16 wherein said storage unit includes a database.

25. The method of claim 17 wherein said stored security information includes private keys and certificates of said authorized users.

26. The method of claim 16 further including the step of:
- (f) retrieving voice signals from said authorized users and processing said authorized user voice signals to produce said voice information for storage in said storage unit.

* * * * *